United States Patent
Firth

(10) Patent No.: US 7,173,753 B2
(45) Date of Patent: Feb. 6, 2007

(54) OPTICAL DATA RECEIVER SYSTEMS

(75) Inventor: Bradley Firth, Romsey (GB)

(73) Assignee: Roke Manor Research Limited, Romsey (GB)

( * ) Notice: Subject to any disclaimer, the term of this patent is extended or adjusted under 35 U.S.C. 154(b) by 146 days.

(21) Appl. No.: 10/471,698

(22) PCT Filed: Mar. 11, 2002

(86) PCT No.: PCT/EP02/02804

§ 371 (c)(1),
(2), (4) Date: Jun. 16, 2004

(87) PCT Pub. No.: WO02/075975

PCT Pub. Date: Sep. 26, 2002

(65) Prior Publication Data

US 2005/0018270 A1    Jan. 27, 2005

(30) Foreign Application Priority Data

Mar. 15, 2001 (GB) ................................. 0106409.2
Oct. 24, 2001 (GB) ................................. 0125462.2

(51) Int. Cl.
  G02F 2/00    (2006.01)
  G02F 1/01    (2006.01)
  H04B 10/04    (2006.01)
  H04B 10/06    (2006.01)
(52) U.S. Cl. ...................... 359/325; 359/238; 398/183; 398/199; 398/212
(58) Field of Classification Search ................ 398/183, 398/199, 202, 212; 359/238, 325
See application file for complete search history.

(56) References Cited

U.S. PATENT DOCUMENTS

| 4,677,618 A |   | 6/1987 | Haas et al. ................. 714/700 |
| 5,631,758 A |   | 5/1997 | Knox et al. |
| 5,912,751 A | * | 6/1999 | Ford et al. ..................... 398/46 |
| 6,023,361 A | * | 2/2000 | Ford et al. .................. 398/135 |
| 6,097,519 A |   | 8/2000 | Ford et al. ..................... 398/1 |
| 6,356,692 B1 |   | 3/2002 | Ido et al. |
| 6,445,479 B1 | * | 9/2002 | Hornback et al. .......... 398/208 |

FOREIGN PATENT DOCUMENTS

| JP | 62163431 | 7/1987 |
| JP | 09-172429 | 6/1997 |
| JP | 2000-294809 | 10/2000 |
| WO | WO00 04669 | 1/2000 |

OTHER PUBLICATIONS

M. Zirngibl et al, "WDM Receiver By Monolithic Integration Of An Optical Preamplifier, Waveguide Grating Router And Photodiode Array", Electronics Letters, vol. 31, No. 7, Mar. 30, 1995, pp. 581-582.*

* cited by examiner

Primary Examiner—John D. Lee
(74) Attorney, Agent, or Firm—Crowell & Moring LLP

(57) ABSTRACT

An optical data receiver for the distribution and demodulation of compressed TDM data packages comprises, optical distributor means to which the data packages are applied for selective distribution to a plurality of AWG optical demultiplexer/detector arrays, so that each demultiplexer/detector array provides in respect of each data package fed thereto from the optical distributor, a data word the bits of which are presented in parallel.

19 Claims, 1 Drawing Sheet

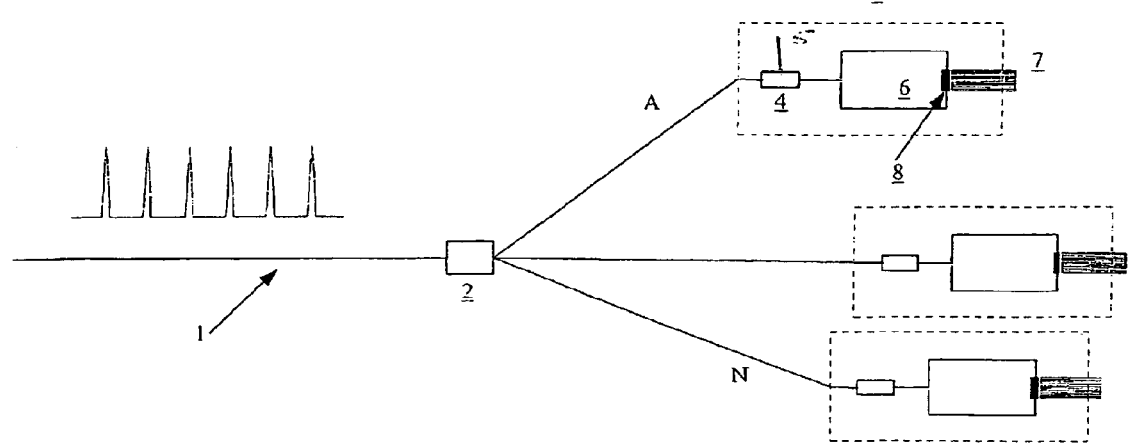
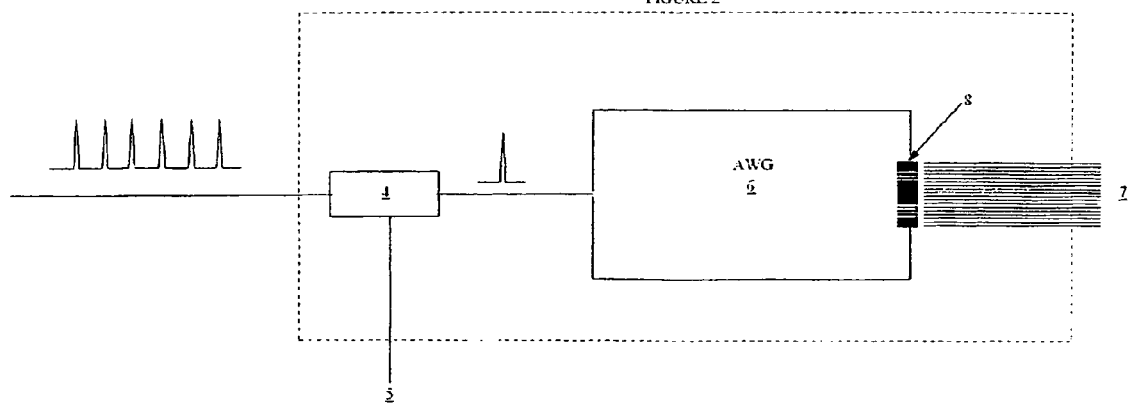

OPTICAL DATA RECEIVER SYSTEMS

BACKGROUND OF THE INVENTION

This invention relates to optical data receiver systems and more particularly it relates to TDM (time division multiplexed) optical data receiver systems. The term optical data receiver systems when used herein, includes systems in which data is transmitted using light in the visible and/or non-visible spectra.

Optical data receiver systems for the reception of TDM data are used in telecommunication signal routers and other high-speed fibre optic networks. One such system is described in the specification accompanying our PCT Patent Publication No. WO 01/10165 A1, to which attention is hereby directed, wherein optically compressed data packets are required to be appropriately routed and decompressed. In such systems there is an ever present requirement to increase data handling rates and to reduce fabrication costs as well as size and power consumption.

SUMMARY OF THE INVENTION

It is an object of this invention to provide an improved data receiver system which serves to facilitate the provision of these desirable characteristics and which lends itself to use in telecommunication data routers and high speed fibre optic networks and the like.

According to the present invention an optical data receiver for the distribution and demodulation of compressed TDM data packages comprises, optical distributor means to which the data packages are applied for selective distribution to a plurality of optical demultiplexer/detector arrays, so that each demultiplexer/detector array provides in respect of each data package fed thereto from the optical distributor, a data word the bits of which are presented in parallel.

The demultiplexer/detector array may comprise an arrayed waveguide grating (AWG).

The optical distributor means may comprise a plurality of optical routing switches, one for each demultiplexer/detector array, which are operatively associated with the demultiplexer/detector array so that TDM data packages are selectively routed thereto as appropriate.

The routing switches may comprise optical modulators.

The modulators may each embody a semiconductor optical amplifier (SOA).

The optical amplifiers may comprise erbium doped optical amplifiers (EDOA).

The optical data receiver may form a part of a telecommunication signal router and be fed with TDM optical data from an optical backplane.

Other objects, advantages and novel features of the present invention will become apparent from the following detailed description of the invention when considered in conjunction with the accompanying drawings.

BRIEF DESCRIPTION OF THE DRAWINGS

FIG. 1 is a generally schematic block diagram of an optical data receiver system; and, FIG. 2 is a schematic block diagram of a part of the system as shown in FIG. 1, wherein corresponding parts bear the same numerical designations.

DETAILED DESCRIPTION OF THE PREFERRED EMBODIMENTS

Referring now to the FIG. 1 of the drawings, TDM optical signals carried on an optical backplane 1, which may form a part of a telecommunications signal router for example, are fed via an optical signal distributor 2, to a demodulator unit 3 which comprises a plurality of similar demux units A to N, only three of which are shown for simplicity, and one of which will now be described with reference to FIG. 2. As shown enlarged in FIG. 2, each of the demux units comprises an optical selector switch 4, to which the TDM signals are fed via the signal distributor 2, from the backplane 1. Operation of each of the optical selector switches 4, is controlled via a control line 5, one for each switch, so that each switch opens at an appropriate instant to pass a selected one the TDM signals to an AWG 6, (arrayed waveguide grating) with which it is operatively associated, thereby to provide in parallel at an output port 7, of a linear detector array 8, the bits of a data word corresponding to data which comprises a selected TDM signal. The mode of operation of AWGs is well known and will not therefore be described in detail herein, except to say each data bit of a TDM signal packet, is represented by a different colour or frequency of light, the colours being separated and routed by the AWG 6, collected at the detector array 8, and routed to different output terminals of the output port 7.

The known system as described in WO 01/10165/A1, utilises a serial approach to the decoding of each TDM packet. This has the disadvantage that the data is received in serial format by a high-speed photodiode (e.g. 10 Gb/s or faster). This serial data then has to be electronically processed to produce a parallel data format which is thereafter processed by following electronic circuitry which operates at a slower rate. This thus imposes a processing speed constrain. Use of a parallel optical receiver as described herein, is not only faster but it reduces the number of high-speed electronic components required, thus reducing power consumption and potentially reducing fabrication costs and size.

In a receiver as described herein, each TDM packet is effectively split into its spectral components by an arrayed waveguide grating and thus decoded in parallel format, each defined spectral component representing one bit of the compressed data. Each spectral component of a received packet (i.e. each bit) is directed to a separate element of the detector array 8. The compressed optical data packet is thus demultiplexed and received as a parallel word which can thereafter interface directly with lower speed electronics (not shown). The linear detector array 8, may be bonded to the substrate of the AWG 6. The optical modulator or selector switch 4, may be selected from devices based on electro-absorption or electro-optic effects, or implemented as a gated optical amplifier depending on system requirements. Currently modulators can be realised in InP, LiNbO3 or optical polymers. An optical amplifier may be included to boost the optical signal, which may be integrated with the modulator or selector switch 4. The AWG 6, may be made by processes based on, silicon on insulator, silica on silicon, or indium phosphide.

The detector array 8, would conventionally be made from a semiconductor material responsive to the infra-red part of the electromagnetic spectrum notably the wavelengths used for fibre optic communications (examples are InGaAs, InP).

Other dispersive components such as prisms or diffraction gratings could be used to effect decoding and deserialisation of the packet. The advantages of the use of an arrayed waveguide grating are:

it is a compact planar component;

it may be mass-produced on a silicon substrate using the existing manufacturing processes, which have been developed by the electronics industry;

it has low waveguide losses and low coupling losses to the single mode optical fibre and the detector array;

the filter characteristics of the channels can be carefully adjusted to meet design requirements (e.g. channel bandwidth, spectral profile, loss equalisation);

erbium doped waveguides could be included in the AWG design so that optical gain could be used to boost the signal level and thus increase the SNR (signal to noise ratio) of the detector array 8.

As process technology progresses, the device could be integrated on an integrated photonic chip made from InP thus realizing smaller dimensions and manufacturing efficiency from using a single manufacturing process technology. Such an implementation is described in U.S. Pat. No. 5,689,122.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A method for transmitting data, comprising the steps of:
generating a chirped optical carrier pulse;
serially modulating the carrier pulse with a data word;
compressing the modulated pulse;
transmitting the compressed modulated pulse over a transport medium;
receiving the compressed modulated pulse; and
decompressing the modulated pulse;
wherein the method further comprises:
  wavelength demodulating the modulated pulse into a plurality of wavelength components, each wavelength component representing one bit of the data word, the data word being represented in parallel by the plurality of wavelength components.

2. A method according to claim 1, wherein a plurality of data words are encoded into a sequential plurality of compressed modulated pulses transmitted over the transport medium, further comprising the steps of:
selecting one of the plurality of compressed modulated pulses; and
decompressing and wavelength demodulating the selected modulated pulse into a plurality of wavelength components, each wavelength component representing one bit of the data word, the data word being represented in parallel by the plurality of wavelength components.

3. A method according to claim 2, further comprising the steps of
providing a plurality of selecting means, each with respective associated decompression means and wavelength demodulating means, in parallel;
arranging for the sequential plurality of compressed modulated pulses to be applied to each of the selecting means;
in each of the selecting means, selecting a respective one of the sequential plurality of compressed modulated pulses; and
decompressing and wavelength demodulating the respective selected compressed modulated pulses, each into a plurality of wavelength components, each wavelength component representing one bit of the data word, the data word being represented in parallel by the plurality of wavelength components.

4. A method according to claim 1, wherein the steps of decompressing and wavelength demodulating are performed by applying the respective compressed modulated pulse to an optical demultiplexer/detector array.

5. A method according to claim 4, wherein the step of applying the respective compressed modulated pulse to an optical demultiplexer/detector array comprises applying the respective compressed modulated pulse to an arrayed waveguide grating (AWG).

6. A method according to claim 5, wherein a detector array is provided, integrated with the AWG.

7. A method according to claim 3, wherein the selecting means comprise optical modulators.

8. A method according to claim 7 wherein the optical modulators each embody a semiconductor optical amplifier (SOA).

9. A method according to claim 7 wherein the optical modulators comprise erbium doped optical amplifiers (EDOA).

10. A signal router arranged to operate according to a method as defined in claim 1.

11. An optical data receiver for the distribution and demodulation of compressed TDM data packages, said optical data receiver comprising optical distributor means to which the data packages are applied for selective distribution to a plurality of optical demultiplexer/detector arrays, wherein each demultiplexer/detector array provides in respect of each data package fed thereto from the optical distributor, a data word the bits of which are presented in parallel.

12. An optical data receiver as claimed in claim 11, wherein the demultiplexer/detector array comprises an arrayed waveguide grating (AWG).

13. An optical data receiver as claimed in claim 12, wherein the AWG is integrated with the detector array.

14. An optical data receiver as claimed in claim 13, wherein the optical distributor means comprises a plurality of optical routing switches, one for each demultiplexer/detector array, which are operatively associated with the demultiplexer/detector arrays so that TDM data packages are selectively routed thereto as appropriate.

15. An optical data receiver as claimed in claim 14, wherein the routing switches comprise optical modulators.

16. An optical data receiver as claimed in claim 15, wherein the optical modulators each embody a semiconductor optical amplifier (SOA).

17. An optical data receiver as claimed in claim 16, wherein the optical amplifiers comprise erbium doped optical amplifiers (EDOA).

18. An optical data receiver as claimed in claim 11, wherein, the optical data receiver forms a part of a telecommunication signal router and is fed with TDM optical data from an optical backplane.

19. A signal router including a data receiver as claimed in claim 11.

* * * * *